Feb. 6, 1940.    W. I. BALLENTINE    2,189,440
SWITCH MECHANISM
Filed July 17, 1937
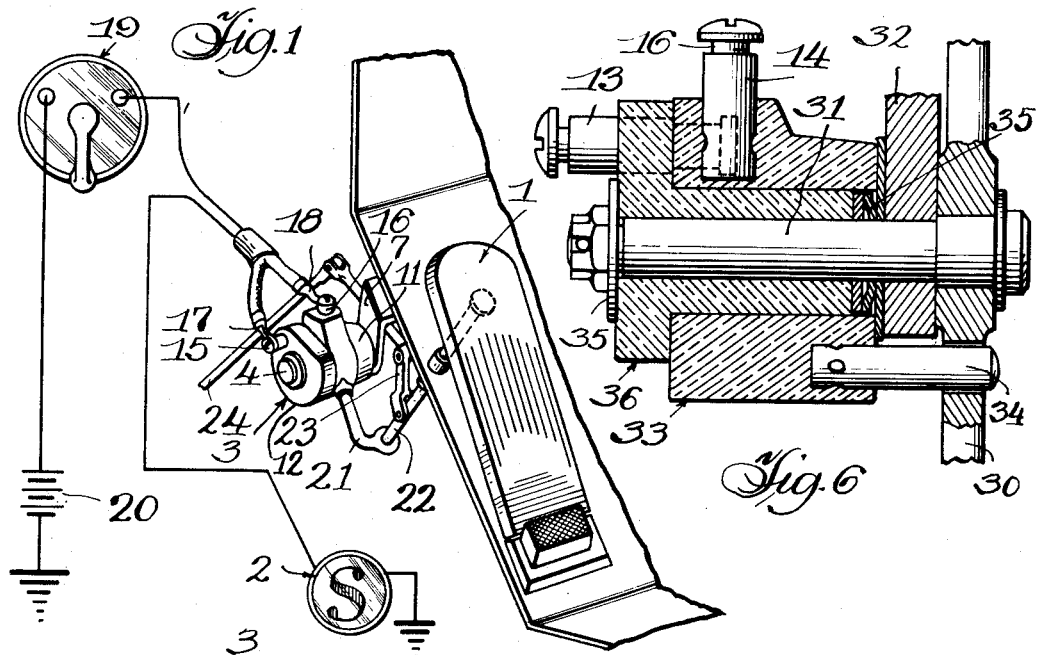
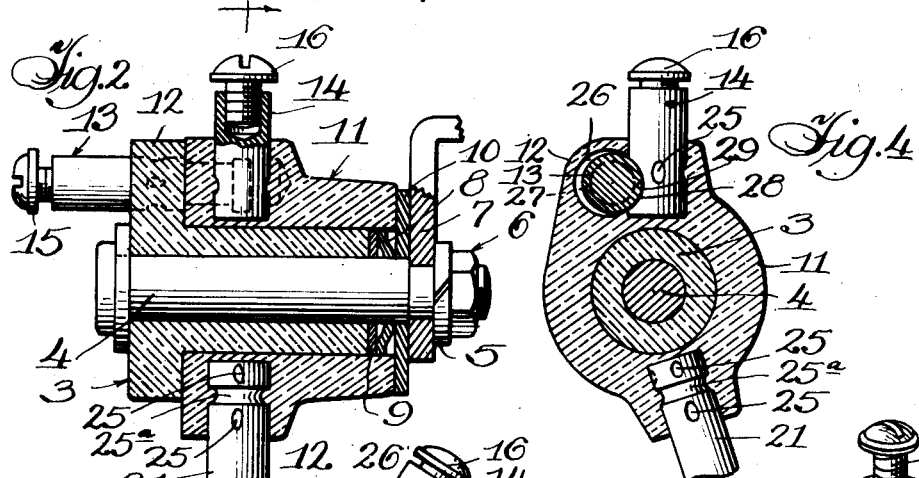
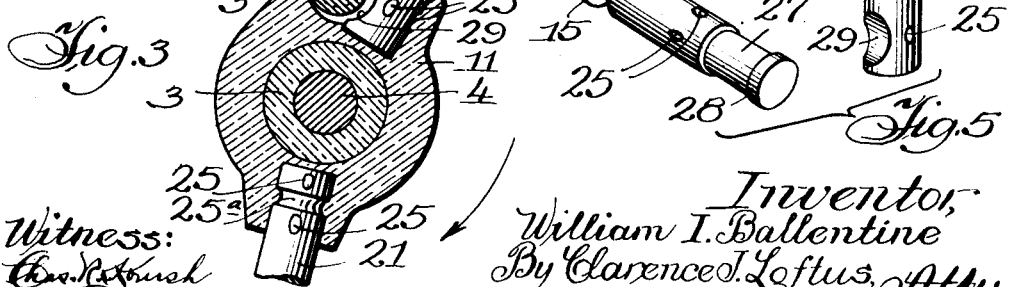
Inventor,
William I. Ballentine
By Clarence T. Loftus, Atty.

Patented Feb. 6, 1940

2,189,440

UNITED STATES PATENT OFFICE 2,189,440

SWITCH MECHANISM

William I. Ballentine, Chicago, Ill.

Application July 17, 1937, Serial No. 154,163

1 Claim. (Cl. 200—59)

The present invention relates to a switch mechanism adapted for use on automobiles and other power propelled vehicles and more particularly to a novel switch mechanism so constructed and arranged as to operate from the throttle or accelerator lever or linkage of the vehicle.

Switching mechanisms now generally employed for initiating or flashing a signal at the rear of the vehicle to apprise the vehicle following of the operator's intention to slow down or stop are operated by pressure on the brake pedal. This requires the operator to remove his foot from the foot throttle and apply it to the brake. Due to the high speed at which automobiles and other power propelled vehicles are being operated, the element of time necessary to apply the brake and flash the signal is of extreme importance so as to signal the car following at the earliest instant of the intention of slowing down or stopping. The signalling is accomplished in my novel construction and arrangement the instant the car decelerates.

It is, therefore, an object of the present invention to provide a novel means and mechanism to immediately signal to a car following the fact that the preceding car is slowing down or decelerating. This is accomplished in the novel switch construction immediately upon a slight rearward or decelerating movement of the throttle lever.

A further object of the present invention is to provide a novel switching mechanism for operating a warning signal, which mechanism is automatically actuated by a slight rearward or decelerating movement of the throttle. Thus the human element, insofar as actuating or initiating a signal, is entirely eliminated.

A still further object is to provide a novel switching mechanism operating on the fulcrum pin and its carrying bracket and actuated by the foot pedal.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while I have shown therein a preferred embodiment, it is to be understood that the same is susceptible of modification and change, and comprehends other details, arrangements of parts, features and constructions without departing from the spirit of the invention.

In the drawing:

Fig. 1 is a view in perspective of the novel construction and arrangement.

Fig. 2 is a view in vertical cross section through the novel switch mechanism.

Fig. 3 is a view in vertical cross section through the switch taken on the line 3—3 of Fig. 2, and showing the position of the contacts and parts when the throttle is depressed and the switch is open.

Fig. 4 is a view similar to Fig. 3, but showing the switch closed upon a rearward movement of the throttle.

Fig. 5 is a disassembled view in perspective of the contacts.

Fig. 6 is a view in vertical cross section of an alternate form of switch.

The novel construction comprises a device adapted to be associated with the throttle or accelerator lever or linkage of an automobile or other power propelled vehicle, such as trucks, throttle controlled trains, trolley cars, etc., through the throttle 1 for operating a signal light 2 mounted at some convenient location at the rear of the vehicle or the like. This device is preferably built in or assembled at the factory, although it is to be understood that it may be provided as an attachment which may be readily mounted in a position to be operated by the throttle control mechanism of the car.

The switch comprises a sleeve 3 carried upon a pin 4 which may be the usual fulcrum pin for the accelerator lever or a pin or stub shaft substituted therefor and secured by a lock washer 5 and nut 6 upon a bracket 7 fixed to and supported in any suitable way from the underside of the foot board or floor or other convenient location on the vehicle. Upon the stud 4 is mounted a spring washer 8 seating against a washer 9 abutting the sleeve and a washer 10 positioned intermediate the bracket 7 and collar 11 rotatable on the sleeve. This collar is retained against longitudinal or endwise movement by means of the washer 10 and enlargement or flange 12 on the sleeve.

The sleeve 3 and collar 11 are provided with binder posts 13 and 14, respectively, having threaded connections 15 and 16 adapted to receive leads 17 and 18 for energizing the signal lamp 2 or initiate any other desirable signalling means through the ignition switch 19 and battery 20. The collar 11 is further provided with a lever 21 adapted to be moved by a slidable pin or rod 22 actuated by the foot throttle 1. This pin or rod 22 is connected to the accelerating or throttle lever of the carburetor by means of a system of links or levers 23 and rod 24, although it is to be understood that the switch may be actuated in any suitable or convenient manner from the accelerator mechanism.

The sleeve and collar forming the switch members are preferably constructed of Bakelite, fibre or other non-conducting material in which are cast the operating lever 21 and binder posts 13 and 14. As clearly disclosed, these members are notched and/or grooved as at 25 and 25ᵃ to prevent their coming out and rotating relative to the switch members in which they are mounted, after they have been cast, moulded or embedded in the switch members. As shown in Figs. 2 and 5, the binder post 13 is securely mounted in the sleeve 3 and extends into a recess 26 in the collar 11 of greater diameter than the post. This post is reduced as at 27 with the end 28 forming the switch contact adapted to engage the concaved contact portion 29 of the binder post 14. The purpose of reducing the binder post 13 adjacent its end is to insure electrical contact between the binder posts when the switch contacts are moved into the position shown in Fig. 4. In the disclosed embodiment, these posts are positioned at right angles to each other.

In the operation of the device, pressure applied to advance the throttle to accelerate the engine forces the pin 22 downwardly and rotates the lever 21 in a clockwise direction as shown by the arrow in Fig. 3. This, in turn, rotates the collar 11 into the position shown in Fig. 3 in which the switch contacts on the binder posts 13 and 14 are separated and the circuit to the signalling means is maintained open. When the foot throttle is permitted to move backwardly or towards its position of rest, the collar rotates in a counter-clockwise direction and the contacts on the binder posts engage and close the circuit to the signal light or other signalling means and the collar and sleeve rotate together. The spring washer 8 holds the sleeve 3 against rotation except by the movement of the collar 11.

In Fig. 6 is shown an alternate form of switch mechanism in which the accelerating lever 30 is pivotally mounted on a fulcrum pin or the like 31 carried by the bracket 32. In this construction, the collar 33 is connected to the lever 30 by means of a pin 34 and rotated thereby. Spring washers 35 are adapted to put a drag on the sleeve 36 to prevent its rotation except upon its movement by the collar 33. In other respects, the switch construction is similar to that shown in Figs. 1 to 5 inclusive.

It will be apparent from the above description that the novel invention comprises switch mechanism associated with the throttle or accelerator whereby in any position of this throttle from rest or stop position to a position for maximum speed, the signal light will be actuated or flashed by a slight upward or backward movement of the throttle. As shown in Fig. 1, the switch mechanism is preferably associated or in series with the ignition switch 19 so that the circuit remains open at all times when the engine is stopped.

Having thus disclosed the invention, I claim:

In a switch mechanism for operating a warning signal on a self-propelled vehicle having an accelerating lever, a pin upon which the switch is mounted for rotation, a sleeve of non-conducting material rotatably mounted on the pin and having an enlargement, a switch terminal carried in the enlargement, a collar of non-conducting material rotatable upon the sleeve and having an end abutting the enlargement on the sleeve, a switch terminal carried by the collar, a recess formed in the material of the collar for receiving the end of the terminal carried by the sleeve, and of a size to permit the terminals to be moved into and out of contact, an arm associated with the accelerating lever and actuated thereby for rotating the collar to move the switch terminals into and out of contacting engagement to close and open the circuit to the signal and a spring washer between the sleeve and collar for yieldably maintaining them in each position.

WILLIAM I. BALLENTINE.